United States Patent
Gibbs et al.

(10) Patent No.: US 10,623,346 B2
(45) Date of Patent: Apr. 14, 2020

(54) COMMUNICATION FINGERPRINT FOR IDENTIFYING AND TAILORING CUSTOMIZED MESSAGING

(71) Applicant: INTERNATIONAL BUSINESS MACHINES CORPORATION, Armonk, NY (US)

(72) Inventors: Nathaniel J. Gibbs, Iowa City, IA (US); Matthew M. Lobbes, Northlake, TX (US); Shelbee D. Smith-Eigenbrode, Thornton, CO (US); Brian J. Snitzer, Lancaster, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/279,033

(22) Filed: Feb. 19, 2019

(65) Prior Publication Data

US 2019/0182187 A1 Jun. 13, 2019

Related U.S. Application Data

(63) Continuation of application No. 15/228,194, filed on Aug. 4, 2016, now Pat. No. 10,257,126.

(51) Int. Cl.
*G06F 15/16* (2006.01)
*H04L 12/58* (2006.01)
*G06Q 30/02* (2012.01)

(52) U.S. Cl.
CPC ......... *H04L 51/04* (2013.01); *G06Q 30/0271* (2013.01); *H04L 51/02* (2013.01); *H04L 51/063* (2013.01); *H04L 51/10* (2013.01)

(58) Field of Classification Search
CPC ....... H04L 51/04; H04L 51/02; H04L 51/063; H04L 51/10; G06Q 30/0271
See application file for complete search history.

(56) References Cited

U.S. PATENT DOCUMENTS 6,904,408 B1 6/2005 McCarthy et al.
7,734,754 B2 6/2010 Dougherty et al.
(Continued)

FOREIGN PATENT DOCUMENTS

WO 2008077178 7/2008

OTHER PUBLICATIONS

Manktelow et al., "Dealing With Angry People", Mind Tools, http://www.mindtools.com/pages/article/dealing-with-angry-people.htm, Accessed Jul. 26, 2016, 7 pages.
(Continued)

*Primary Examiner* — Jonathan A Bui
(74) *Attorney, Agent, or Firm* — Brian Restauro; Andrew D. Wright; Roberts Mlotkowski Safran Cole & Calderon, P.C.

(57) ABSTRACT

A computer-implemented for delivering tailored content to an individual includes: obtaining, by a computer system, communications of the individual; obtaining, by the computer system, a communication fingerprint for the individual based on analysis of the communications of the individual; tailoring, by the computer system, a message to the individual using the communication fingerprint; and delivering the message to the individual. Using sentiment analysis combined with a unique communication fingerprint for an individual advantageously provides for a more tailored, and thus more effective, communication to the individual.

15 Claims, 4 Drawing Sheets

(56) References Cited

U.S. PATENT DOCUMENTS

| | | | |
|---|---|---|---|
| 8,095,613 B1* | 1/2012 | Perkowitz | G06Q 10/109 709/207 |
| 8,838,435 B2 | 9/2014 | Talley et al. | |
| 9,245,250 B2 | 1/2016 | Williams | |
| 9,875,286 B1 | 1/2018 | Lewis et al. | |
| 2003/0142809 A1 | 7/2003 | Coffey | |
| 2004/0137416 A1 | 7/2004 | Ma et al. | |
| 2004/0268217 A1 | 12/2004 | Hughes et al. | |
| 2006/0010217 A1* | 1/2006 | Sood | H04L 51/12 709/206 |
| 2007/0245245 A1* | 10/2007 | Blue | G06Q 10/10 715/739 |
| 2008/0139112 A1 | 6/2008 | Sampath et al. | |
| 2009/0012847 A1 | 1/2009 | Brooks et al. | |
| 2010/0057527 A1 | 3/2010 | Robert | |
| 2010/0088086 A1* | 4/2010 | Hughes | G06F 17/2881 704/8 |
| 2010/0223341 A1* | 9/2010 | Manolescu | H04L 51/32 709/206 |
| 2011/0144971 A1 | 6/2011 | Danielson | |
| 2012/0041903 A1 | 2/2012 | Beilby et al. | |
| 2012/0158465 A1 | 6/2012 | Golembiewski et al. | |
| 2012/0254181 A1 | 10/2012 | Schofield et al. | |
| 2012/0324220 A1* | 12/2012 | Norton | G06F 21/552 713/165 |
| 2012/0329016 A1 | 12/2012 | Kapoor et al. | |
| 2013/0066716 A1 | 3/2013 | Chen et al. | |
| 2013/0097270 A1 | 4/2013 | Plotkin | |
| 2013/0246536 A1* | 9/2013 | Yadava | G06Q 10/107 709/206 |
| 2013/0275048 A1* | 10/2013 | Hong | G06F 17/00 702/19 |
| 2013/0304742 A1 | 11/2013 | Roman et al. | |
| 2013/0325755 A1 | 12/2013 | Arquette et al. | |
| 2014/0280623 A1 | 9/2014 | Duan | |
| 2015/0033141 A1* | 1/2015 | Mishra | H04L 51/22 715/752 |
| 2015/0066814 A1 | 3/2015 | Allen et al. | |
| 2015/0149285 A1 | 5/2015 | Schroeter | |
| 2015/0221336 A1 | 8/2015 | Deen et al. | |
| 2016/0042281 A1 | 2/2016 | Cunico et al. | |
| 2016/0042648 A1 | 2/2016 | Kothuri | |
| 2016/0048547 A1 | 2/2016 | Bastide et al. | |
| 2016/0050166 A1 | 2/2016 | Smith | |
| 2016/0226811 A1* | 8/2016 | Kerschhofer | H04L 51/26 |
| 2016/0337301 A1 | 11/2016 | Rollins et al. | |
| 2017/0177554 A1* | 6/2017 | Emmons | H04L 51/063 |
| 2017/0180276 A1 | 6/2017 | Gershony et al. | |
| 2017/0201471 A1 | 7/2017 | Miklos et al. | |
| 2017/0222961 A1* | 8/2017 | Beach | H04L 51/16 |
| 2017/0289088 A1* | 10/2017 | Quintero | H04L 51/08 |
| 2017/0337199 A1 | 11/2017 | Kogan et al. | |
| 2017/0344224 A1* | 11/2017 | Kay | G06F 3/04817 |
| 2018/0007199 A1* | 1/2018 | Quilici | H04M 15/06 |
| 2018/0041451 A1 | 2/2018 | Gibbs et al. | |
| 2018/0089310 A1 | 3/2018 | Barsness et al. | |

OTHER PUBLICATIONS

Orloff, "4 Tips to Deal With Frustrating People", Psychology Today, https://www.psychologytoday.com/blog/emotional-freedom/201202/4-tips-deal-frustrating-people, Accessed Jul. 26, 2016, 5 pages.

List of IBM Patents or Patent Applications Treated as Related, dated Feb. 19, 2019, 1 page.

* cited by examiner

COMMUNICATION FINGERPRINT FOR IDENTIFYING AND TAILORING CUSTOMIZED MESSAGING

BACKGROUND

The present invention generally relates to systems and methods for delivering content and, more particularly, to systems and methods for tailoring messages to individuals using an individualized communication fingerprint based on cognitive-computing analytics.

It is common for a communication to be tailored based on demographics of a group of people that constitute a target audience of the communication. For example, a presentation to a group of people in a workplace setting is often tailored to the group of people using workplace-based demographics of the group of people. Such workplace-based demographics may include, for example, what roles the audience members perform in the organization, to whom the audience members are accountable, types of presentations the audience members accustomed to, etc.

Another example of tailoring communications to the target audience occurs in the use of chatbots. A chatbot is typically an automated messaging window that is presented in a website that is visited by an individual. The content presented by the chatbot is typically based on group demographic information. For example, a chatbot may present content to an end user based on patterns of access associated with a demographic group including: monitoring a plurality of users' web site accesses; using Natural Language Processing (NLP) against profiles for the plurality of users and content on web sites; applying analytical analysis to associate demographic group with patterns of access on a web site; and, in response to detecting a user accessing a web site and a demographic group for the user, presenting content for the web site to the user according to the patterns of access associated with the demographic group.

Another example of tailoring communications to a target audience occurs in advertising. The content and medium of an advertisement is routinely tailored to a target audience using consumer-based demographics of the group of people in the target audience. For example, snack foods are commonly advertised on television broadcasts of sporting events.

However, communications that are tailored based on the demographics of a group are by definition not specifically tailored to any single individual. As a result, communications that are tailored based on group demographics are less effective with a particular person than a communication that is specifically tailored to that particular person.

SUMMARY

In a first aspect of the invention, there is a method for delivering tailored content to an individual. The method includes: obtaining, by a computer system, communications of the individual; obtaining, by the computer system, a communication fingerprint for the individual based on analysis of the communications of the individual; tailoring, by the computer system, a message to the individual using the communication fingerprint; and delivering the message to the individual. Using sentiment analysis combined with a unique communication fingerprint for an individual advantageously provides for a more tailored, and thus more effective, communication to the individual.

The method may include: receiving feedback from the individual based on the message; and updating the communication fingerprint for the individual based on the feedback. This provides the advantage of refining the accuracy of the communication fingerprint for the individual based on the feedback from the individual.

The method may include: obtaining at least one additional communication from the individual; and updating the communication fingerprint for the individual based on the at least one additional communication. This provides the advantage of refining the accuracy of the communication fingerprint for the individual based on additional communications from the individual.

In another aspect of the invention, there is a system comprising: a CPU, a computer readable memory and a computer readable storage medium associated with a computing device; program instructions to obtain a communication fingerprint of an individual based on an analysis of communications of the individual; program instructions to obtain a message fingerprint of a message intended for the individual based on an analysis of the message; program instructions to compare the message fingerprint to the communication fingerprint; and program instructions to output a result of the comparison via a user interface. The program instructions are stored on the computer readable storage medium for execution by the CPU via the computer readable memory.

In another aspect of the invention, there is a computer program product for delivering tailored content to an individual. The computer program product comprises a computer readable storage medium having program instructions embodied therewith. The program instructions are executable by a computing device to cause the computing device to: perform an application program interface (API) call to a server via a network, wherein the API call includes communications of the individual; receive a communication fingerprint of the individual from the server, wherein the communication fingerprint is based on an analysis of the communications included in the API call; receive a message via a user interface (UI); obtain a message fingerprint of the message based on an analysis of the message; compare the message fingerprint to the communication fingerprint; and output a result of the comparison via the UI.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
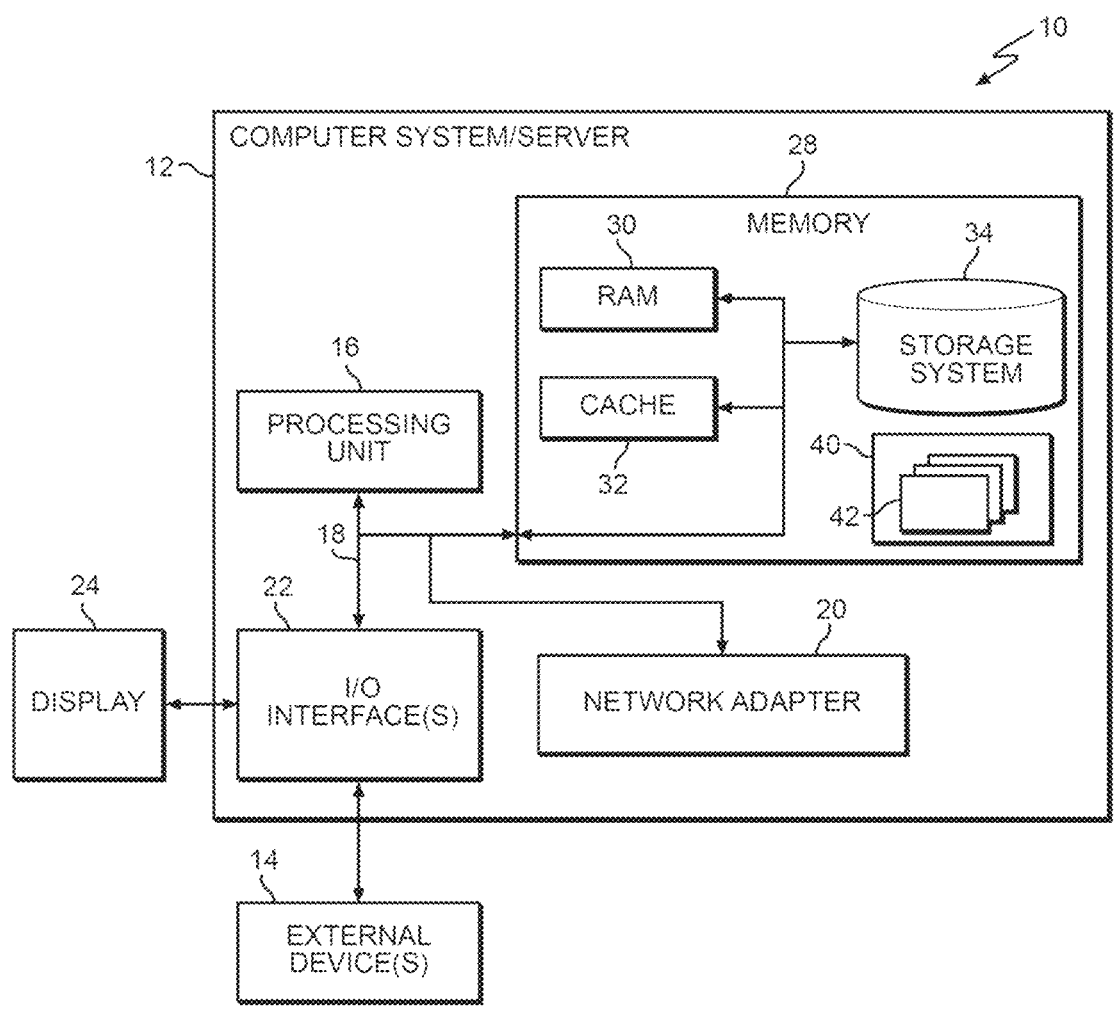
FIG. 1 depicts a computing infrastructure according to an embodiment of the present invention.

The present invention generally relates to tailoring messages to individuals and, more particularly, to systems and method for tailoring messages to individuals using an individualized communication fingerprint based on cognitive-computing analytics. According to aspects of the invention there is a system and method for delivering content, comprising: analyzing communication from a targeted audience, continuously learning and developing a communication fingerprint for the targeted audience based on the analyzed communication, and delivering content in a style complementary to the developed communication fingerprint.

When communicating with a particular person it is advantageous to tailor the communication using a determined set of communication methods that are based on an identified communication pattern. Aspects of the present invention use cognitive-computing analytics (e.g., sentiment analysis, semantic analysis, tone analysis, etc.) of an individual's past communications to create a communication fingerprint for that person, and then use the communication fingerprint to tailor future communications to that person. Using cognitive-computing analytics combined with a unique communication fingerprint for a person advantageously provides for a more tailored, and thus more effective, communication to the specific individual.

In embodiments, an individualized communication fingerprint is created for an individual based on analysis of communications associated with the individual. The analysis may include, for example, at least one from a group consisting of: sentiment analysis; semantic analysis, and tone analysis. Communications are then tailored specifically to the individual using the communication fingerprint of the individual. For example, a proposed communication may be compared to the communication fingerprint of the individual and sent to the individual or revised based on the result of the comparing. Aspects of the invention may also utilize feedback from the individual to further refine the communication fingerprint of the individual. In this manner, implementations of the invention provide customized messaging that is specifically tailored to an individual.

Aspects of the present invention provide a technical solution to the technical problem of computer-based tailoring of messages being performed at a group level instead of an individual level. For example, aspects of the present invention include a computer-based system and/or method to create a communication fingerprint for an individual using computer-based analysis of communications from the individual, and utilize the individualized communication fingerprint in an automated manner for generating new communications to the individual. Implementations of the invention may employ technical solutions including application program interface (API) calls between different computer applications for the purpose of performing an analysis, creating a communication fingerprint based on the analysis, and comparing a proposed communication to the communication fingerprint. Implementations of the invention may utilize computer-based sentiment analysis, which itself is a technical solution that involves the automated use of natural language processing, text analysis, and computational linguistics to identify and extract subjective information in source materials.

According to aspects described herein, a communication fingerprint refers to the unique communication pattern identified for an individual that targets the most effective communication methods to use for that individual. A communication fingerprint could potentially be: textual in terms of identifying sentiment in text (e.g., using negative words, sarcasm, positive words, etc.); visual by identifying visual cues (e.g., crossing arms, frowning, smiling, etc.); and auditory by identifying vocal fluctuations (e.g., yelling, lowered voice, etc.).

Disclosed is a method to utilize identified communication patterns for a specific person to create a communication fingerprint for that individual that can be utilized to effectively target communication to solicit a desired response from that individual. An advantage provided by aspects of the invention is to more effectively identify how a specific individual prefers to communicate and what type of communication they are most responsive to for a desired reaction. For example, using a communication fingerprint based on textual analysis for individual "Bob," it is determined that Bob typically responds positively to logic and numbers but does not respond to passion/emotion. A salesperson/program could leverage this communication fingerprint as a method to target a sales pitch for Bob specifically. In another example, using a communication fingerprint based on visual/auditory cues, a pattern could be identified that Bob reacts in an angry manner every time a specific topic is raised or if someone is communicating in what could be perceived as a sarcastic tone. In this case, the communication fingerprint provides the advantage of allowing a party to effectively target a communication specifically to Bob using a communication method that does not employ a sarcastic tone. In this manner, implementations of the invention provide the advantage of messages being tailored specifically to an individual instead of based on group demographics, with the tailoring being performed based on sentiment analysis of past communications from the particular individual.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
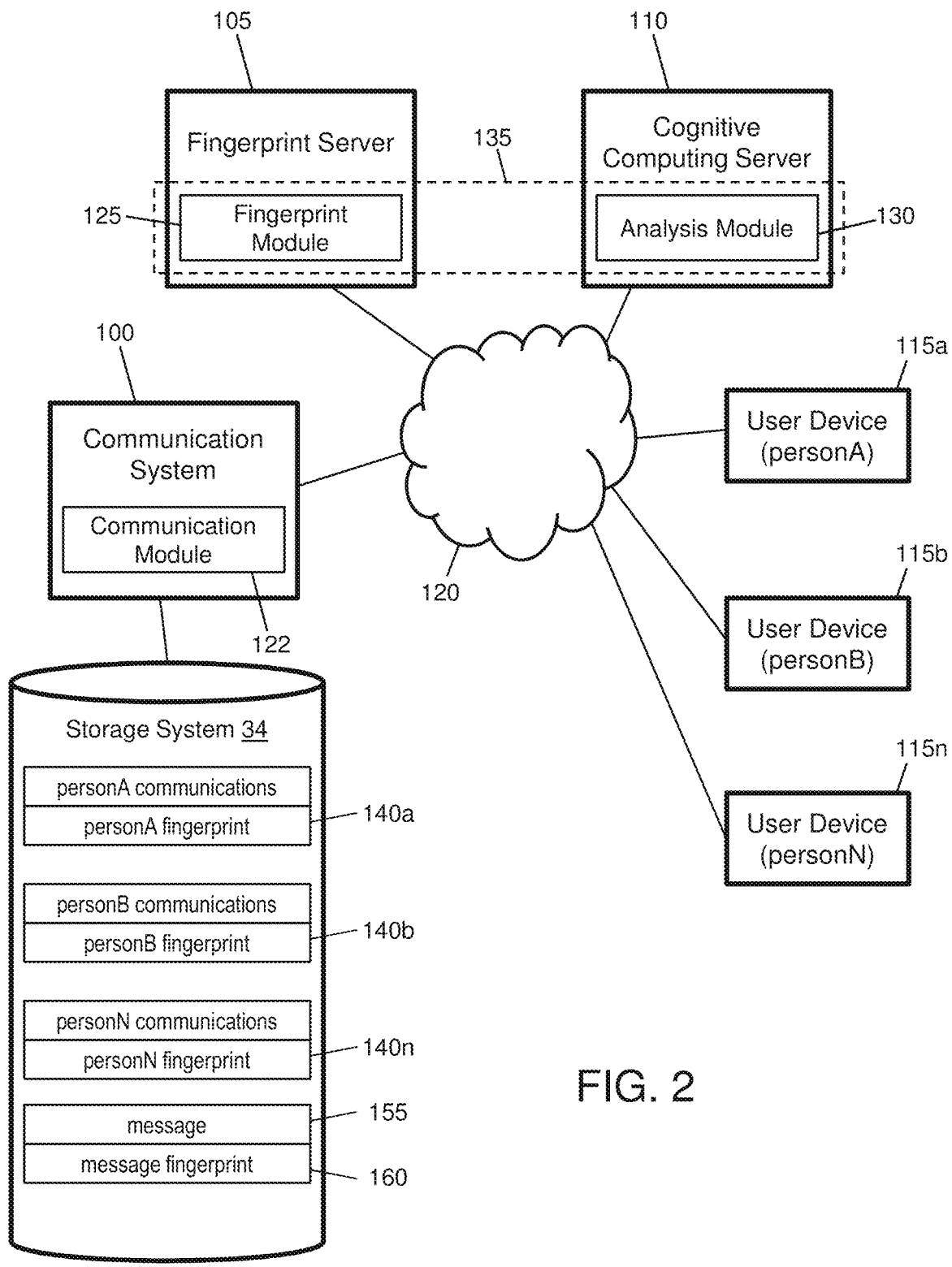
FIG. 2 shows a block diagram of an exemplary environment in accordance with aspects of the invention.

FIG. 2 shows a block diagram of an exemplary environment in accordance with aspects of the invention. In embodiments, the environment includes a communication system 100, a fingerprint server 105, a cognitive computing server 110, and plural user devices 115a, 115b, . . . , 115n connected to a network 120. The network 120 may be any suitable computer network such as, for example, a LAN, WAN, or the Internet.

The communication system 100 may be a computer system 12 as shown in FIG. 1, and runs an application (e.g., software program) having a communication module 122 that corresponds to a program module 42 of FIG. 1. The fingerprint server 105 may be a computer system 12 as shown in FIG. 1, and runs an application (e.g., software program) having a fingerprint module 125 that corresponds to a program module 42 of FIG. 1. The cognitive computing server 110 may be a computer system 12 as shown in FIG. 1, and runs an application (e.g., software program) having a analysis module 130 that corresponds to a program module 42 of FIG. 1.

The user devices 115a-n may be any suitable computer devices that are capable of sending communications through the network 120 to other computing devices. For example, each user device may comprise one of a smartphone, tablet computer, laptop computer, desktop computer, etc. Each user device 115a-n is associated with (e.g., operated by) a particular individual. For example, user device 115a is associated with personA, user device 115b is associated with personB, and user device 115n is associated with personN. The various individuals may utilize their user devices 115a-n to send computer-based communications such as: text communications including but not limited to email, social media interactions, publications, online postings such as reviews and comments; visual communications including but not limited to social media videos such as Facebook, Google Hangouts, and iChat; and auditory communications including but not limited to voicemails, meeting recordings, interview recordings, and testimony recordings.

In accordance with aspects of the invention, the communication system 100 collects and stores communications from the various user devices 115a-n. The communications may be collected using any legitimate mechanisms. For example, it is envisioned that the most common mechanism will be collecting direct communications from the individual, such as emails, text messages, direct messages (tweets), voicemails, etc., that an individual (e.g., personA) directs to an entity (e.g., user and/or business) associated with the communication system 100. Other mechanisms may include collecting communications that are not directed to the entity associated with the communication system 100, but that are made publicly available by the individual. For example, the communication system 100 may use conventional tools (e.g., crawlers, etc.) to collect communications from publicly available sources such as social media, reviews or comments on websites, publications, etc. Aspects of the invention are not limited to these examples, and any legitimate mechanisms may be used to collect any one or more of text, visual, and auditory communications from each of the user devices 115a-n.

In embodiments, the communication system 100 stores the collected communications from each individual for later processing by the fingerprint server 105. For example, the communication system 100 may store the communications in a storage system 34 in an indexed manner such that the stored communications of each individual are separately accessible from those stored communications of other individuals.

According to aspects of the invention, the communication system 100 utilizes the fingerprint module 125 and the analysis module 130 to create a unique communication fingerprint for each individual, e.g., personA, personB, . . . , personN. In embodiments, the analysis module 130 performs a an analysis of the stored communications associated with an individual, and the fingerprint module 125 creates a communication fingerprint for the individual based on the results of the analysis from the analysis module 130. The analysis may include, for example, at least one of: sentiment analysis; semantic analysis, and tone analysis. A unique communication fingerprint can be created in this manner for each individual, e.g., personA, personB, . . . , personN, and stored in the storage system 34 for later use in preparing a tailored communication to send to a particular individual, as described in greater detail herein.

In a first embodiment, the communication system 100 transmits a request for analysis to the cognitive computing server 110. The request includes one or more of the stored communications associated with an individual, and may be sent via the network 120 as an application program interface (API) call from an application running on the communication system 100 to the analysis module 130. The analysis module 130 performs an analysis of the individual communications included in the request (the analysis is described in greater detail herein), and returns analysis results to the communication system 100, e.g., via the network 120. The communication system 100 then transmits a request to the fingerprint module 125 to create a communication fingerprint. The request includes the analysis results obtained from the analysis module 130, and may be sent via the network 120 as an API call from an application running on the communication system 100 to the fingerprint module 125. The fingerprint module 125 creates a communication fingerprint based on the analysis results included in the request (creating a communication fingerprint is described in greater detail herein), and returns the communication fingerprint to the communication system 100, e.g., via the network 120. In this implementation, the fingerprint server 105 and the cognitive computing server 110 may be nodes in a cloud network, and the fingerprint module 125 and the analysis module 130 may be made available to the communication system 100 as cloud services in the cloud network.

In a second embodiment, the communication system 100 sends the initial request to the fingerprint module 125, which interacts with the analysis module 130 on behalf of the communication system 100. Specifically, the communication system 100 transmits a request to the fingerprint module 125 to create a communication fingerprint. The request includes one or more of the stored communications associated with an individual, and may be sent via the network 120 as an API call from an application running on the communication system 100 to the fingerprint module 125. Upon receipt of the request from the communication system 100, the fingerprint module 125 transmits a request for analysis to the cognitive computing server 110. The request includes the communications received from the communication system 100, and may be sent via the network 120 as an API call from the fingerprint module 125 to the analysis module 130. The analysis module 130 performs an analysis of the communications included in the request, and returns analysis results to the fingerprint module 125, e.g., via the network 120. Upon receiving the analysis results from the analysis module 130, the fingerprint module 125 creates a communication fingerprint based on the analysis results, and returns the communication fingerprint to the communication system 100, e.g., via the network 120. In this implementation, the fingerprint server 105 and the cognitive computing server 110 may be nodes in a cloud network, and the fingerprint module 125 may be made available to the communication system 100 as a cloud service in the cloud network.

In a third embodiment, the fingerprint module 125 and the analysis module 130 are executed on a single computer server, e.g., indicated by dashed box 135, instead of separate servers 105, 110. In this manner, the communication system 100 transmits the initial request to the single server 135 via the network 120, the fingerprint module 125 and the analysis module 130 communicate with one another using APIs within the server 135 to perform the analysis and create the communication fingerprint, and the server 135 returns the communication fingerprint to the communication system 100. In this implementation, the server 135 may be a node in a cloud network, and the fingerprint module 125 and the analysis module 130 may be made available to the communication system 100 as cloud services in the cloud network.

Figure 3:
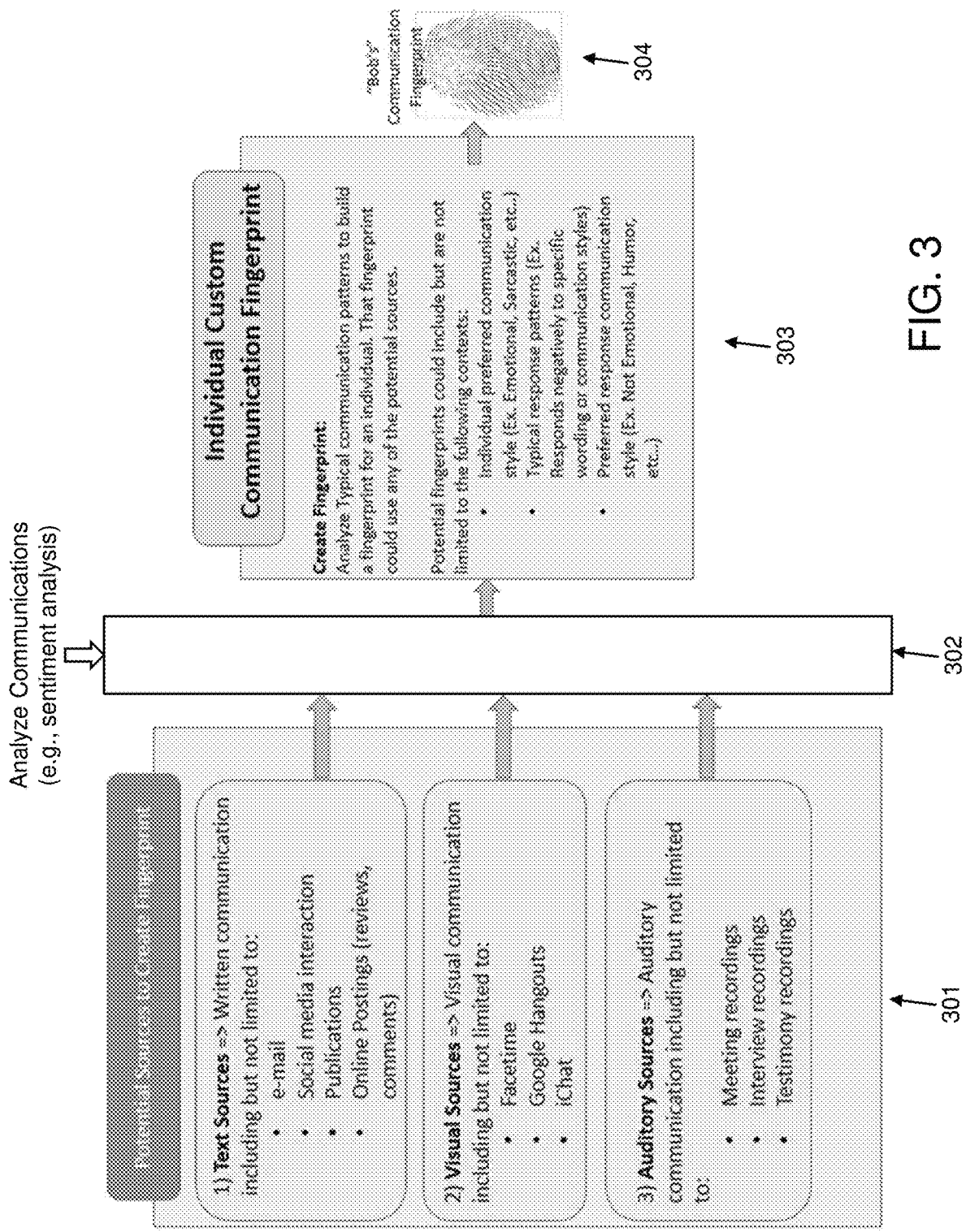
FIG. 3 shows a functional block diagram in accordance with aspects of the invention.

FIG. 3 shows a block diagram of functions in accordance with aspects of the invention. The functions shown in FIG. 3 may be implemented in the environment of FIG. 2 and are described using reference numbers of elements of FIG. 2.

At block 301, the communication system 100 obtains one or more communications from an individual, e.g., personB referred to as "Bob". The communications may be from at least one of text sources, visual sources, and auditory sources, and may be obtained (e.g., collected) in a manner similar to that described with respect to FIG. 2. The system may store Bob's communications in a storage system 34, e.g., as indicated at "personB communications" in FIG. 2.

At block 302, analysis module 130 analyzes Bob's communications, e.g., using at least one of sentiment analysis, semantic analysis, and tone analysis. At block 303, the fingerprint module 125 creates a unique communication fingerprint for Bob based on the analysis results from block 302. At block 304, the communication system 100 stores the unique communication fingerprint for Bob in storage system 34, e.g., as indicated at "personB fingerprint" in FIG. 2.

As described with respect to FIGS. 2 and 3, the cognitive computing server 110 executes the analysis module 130 that performs an analysis of an individual's communications. The analysis may include sentiment analysis, which is a technical solution that involves the computer-based application of natural language processing, text analysis, and computational linguistics to identify and extract subjective information in source materials. The cognitive computing server 110 may be configured to provide other cognitive computing services (in addition to sentiment analysis) to the communication system 100 and/or other systems.

For example, the cognitive computing server 110 may be accessed by applications using different APIs for different services including: document concept analysis, in which the input is text and a collection of documents and the output is related documents and concepts mentioned in the input document; document conversion that transforms a document into a new format, in which the input is a single PDF, Word, or HTML document and the output is an HTML document, a text document, or answer units that can be used with other cognitive computing services; language translation, in which the input is plain text in one of the supported input languages and domains and the output is plain text in the target language selected; natural language classification that interprets the intent behind text and returns a corresponding classification with associated confidence levels, in which the input is text to a pre-trained model and the output is classes ordered by confidence; and relationship extraction that analyzes news articles and use statistical modeling to perform linguistic analysis of the input text, in which the input is text news articles and the output is entities from the text and relationships between those entities in XML format. Each unique service has a respective unique API, such that different applications can access the cognitive computing server 110 using the different APIs to obtain desired services on demand. Moreover, plural instances of a same application may call the cognitive computing server 110 with a same API but with different inputs and thus receive different outputs.

In accordance with aspects of the invention, the communication system 100 or the fingerprint module 125 accesses the cognitive computing server 110 by performing an analysis API call, the input of which is communication data in the form of one or more of text data, visual data, and auditory data (e.g., personB communications in FIG. 2, etc.). In a preferred embodiment, in response to the analysis API call, the analysis module 130 of the cognitive computing server 110 uses computer-based sentiment analysis techniques to determine a sentiment of the communication data, and returns the determined sentiment to the communication system 100 or the fingerprint module 125. The determined sentiment (e.g., sentiment analysis results) may include extracted meta-data including sentiment returned in one or more of XML (Extensible Markup Language), JSON (JavaScript Object Notation), and RDF (Resource Description Framework) formats. A sentiment is a reaction, an opinion, a feeling, or an attitude toward an event or a view of an event, such as an opinion prompted by a feeling. Categories of sentiment returned by the analysis module 130 may include, for example and without limitation, very positive, positive, mixed, negative, very negative, and neutral. The analysis can also include tone analysis, which returns a determined tone of a message, where the tone includes scores for categories such as: anger, disgust, fear, joy, sadness, analytical, confident, tentative, openness, conscientiousness, extraversion, agreeableness, emotional range. Computer-based sentiment analysis, semantic analysis, and tone analysis techniques for each of text data, visual data, and audio data are understood such that further explanation is not believed necessary.

As described with respect to FIGS. 2 and 3, the fingerprint server 105 executes the fingerprint module 125 that creates a communication fingerprint based on the analysis results (e.g., sentiment analysis results) of one or more communications. The fingerprint module 125, upon receipt of the determined analysis results from the communication system 100 or the cognitive computing server 110, creates a communication fingerprint (or updates an existing fingerprint) for the individual based on a combination of the data that was provided as input to the cognitive computing server 110 and the determined sentiment. When the analysis is sentiment analysis, the determined analysis results returned by the cognitive computing server 110 may have plural sentiments for each communication including, for example, sentiment associated with words, phrases, class of message, subclass of message, and others.

For example, a single communication (text, video, or audio) may have plural words and phrases each having a determined sentiment. The fingerprint module 125 may aggregate the determined sentiments from plural communications of the data to provide a measure of which words and phrases the individual associates with positive or negative sentiment.

As another example, each communication may have a determined sentiment associated with the class of communication, e.g., text, video, or audio. The fingerprint module 125 may aggregate the determined sentiments from plural communications of the data to provide a measure of which class of communications the individual associates with positive or negative sentiment.

As another example, each communication may also have a determined sentiment associated with a subclass of the communication. For example, subclasses of the text class may include: email, text message, social media interaction, publications, and online postings. Subclasses of the video class may include: Facetime, Google Hangouts, iChat, meeting audio. Subclasses of the audio class may include: meeting recordings, interview recordings, and testimony recordings. The fingerprint module 125 may aggregate the determined sentiments from plural communications of the data to provide a measure of which subclass of communications the individual associates with positive or negative sentiment.

As another example, each communication may also have a determined tone of the communication. The determined tone may include, for example, respective scores for plural categories of emotion (e.g., anger, disgust, fear, joy, sadness), language (e.g., analytical, confident, tentative), and social (e.g., openness, conscientiousness, extraversion, agreeableness, emotional range). The fingerprint module 125 may aggregate the determined tone from plural communication of the data to provide a measure of the individual's preferred communication style.

In embodiments, the fingerprint module 125 combines (e.g., aggregates) the determined sentiment for plural different communications of an individual into a data structure referred to as a communication fingerprint of the individual. The fingerprint module 125 may use analytics techniques to combine the data and determined sentiment into a communication fingerprint data structure. The data structure may comprise, for example, a matrix, histogram, and/or vector arrangement of the aggregated sentiment data for plural different communications of the individual. In this manner, the fingerprint module 125 creates a communication fingerprint for the individual based on a combination of: plural communications of the individual and determined sentiment associated with the plural communications of the individual. The communication fingerprint may be leveraged in preparing future communications that are tailored specifically for the particular individual, as described in greater detail herein.

FIGS. 2 and 3 have been described thus far with respect to creating a first instance of a communication fingerprint for an individual. Aspects of the invention may also include updating an existing communication fingerprint of an individual based on receiving new communications from the individual. For example, with reference to FIG. 2, the communication system 100 may store a communication fingerprint for personN based on past communications from personN. The communication system 100 may be configured to update the existing communication fingerprint for personN based on receiving one or more new communications from personN.

In a first embodiment of creating an updated communication fingerprint, the communication system 100 operates to: transmit the new communications to the analysis module 130 (e.g., via API call); receive analysis results for the new communications from the analysis module 130; and transmit both the existing communication fingerprint for personN and the analysis results for the new communications to the fingerprint module 125 (e.g., via API call containing both the both the existing communication fingerprint for personN and the analysis results for the new communications). The fingerprint module 125 creates an updated (e.g., revised) communication fingerprint for personN based on the existing communication fingerprint for personN and the analysis results (for the new communications). The fingerprint module 125 returns the updated communication fingerprint to the communication system 100, which stores the updated communication fingerprint in the storage system 34 for later use in preparing communications to personN. In this first embodiment, the fingerprint module 125 and the analysis module 130 are at different nodes in the network, e.g., at different servers 105, 110, and the communication system 100 separately accesses each module 125, 130 with separate requests (e.g., separate API calls).

In a second embodiment of creating an updated communication fingerprint, the communication system 100 transmits the new communications and the existing communication fingerprint for personN to the fingerprint module 125 (e.g., via API call containing both the existing communication fingerprint for personN the new communications). The fingerprint module 125 transmits the new communications to the analysis module 130 (e.g., via API call); receives analysis results for the new communications from the analysis module 130; and creates an updated (e.g., revised) communication fingerprint for personN based on the existing communication fingerprint for personN and the analysis results (for the new communications). The fingerprint module 125 returns the updated communication fingerprint to the communication system 100, which stores the updated communication fingerprint in the storage system 34 for later use in preparing communications to personN. In this second embodiment, the fingerprint module 125 and the analysis module 130 are at different nodes in the network, e.g., at different servers 105, 110, and the fingerprint module 125 communicates with the analysis module 130 on behalf of the communication system 100.

In a third embodiment of creating an updated communication fingerprint, the fingerprint module 125 and the analysis module 130 are at a same nodes in the network, e.g., at server 135. From the point of view of the communication system 100, the third embodiment functions in a similar manner as the second embodiment, i.e., the communication system 100 sends a single request to the fingerprint module 125 (e.g., via API call containing both the existing communication fingerprint for personN the new communications), and receives an updated communication fingerprint from the fingerprint module 125. In contrast to the second embodiment, the third embodiment involves the fingerprint module 125 and the analysis module 130 communicating with one another using APIs within the server 135 to perform the analysis and create the communication fingerprint.

With continued reference to FIG. 2, different communication fingerprints (e.g., 140a, 140b, . . . , 140n) can be created (and updated) in the manner described herein for different respective individuals (e.g., personA, personB, . . . , personN). In this manner, implementations of the invention advantageously provide the ability to specifically tailor a message to a particular individual (e.g., personB) based on a unique communication fingerprint of that particular individual (e.g., personB fingerprint). This provides an improvement over messaging that is tailored to group demographics, since in aspects of the invention the message is specifically tailored to an individual based on analysis of past communications from the individual.

Still referring to FIG. 2, after a communication fingerprint is created for an individual, the communication system 100 may be used to tailor a message to the individual based on the communication fingerprint. For example, a user of the communication system 100 may wish to send a message 155 to personB. In accordance with aspects of the invention, the user inputs the message 155 to the communication system 100, e.g., via a user interface (UI) of the communication system 100. Upon receipt of the message 115, the communication system 100 obtains a message fingerprint 160 for the message 155, e.g., in a manner similar to any of the three embodiments already-described for creating a communication fingerprint. For example, the communication system 100 may send the message 155 to the analysis module 130 to obtain analysis data of the message 155, and then send the message 155 and the analysis data to the fingerprint module 125 to obtain a message fingerprint 160 for the message. In embodiments, the message fingerprint 160 is a data structure similar in configuration to the communication fingerprint data structure.

According to aspects of the invention, upon receiving the message fingerprint 160, the communication module 122 of the communication system 100 compares the message fingerprint 160 to the communication fingerprint of the intended recipient (personB fingerprint 140b in this example). In embodiments, the communication module 122 generates a comparison score based on the comparing the message fingerprint 160 to the communication fingerprint of the intended recipient. In embodiments, the communication module 122 indicates to the user of the communication system 100 whether the comparison score is above or below a predefined threshold value. For example, when the comparison score is above the threshold value, the communication module 122 may generate a first output (e.g., at the UI of the communication system 100) indicating that the message is deemed to be sufficiently tailored to the intended recipient based on the comparison. Alternatively, when the comparison score is below the threshold value, the communication module 122 may generate a second output (e.g., at the UI of the communication system 100) indicating that the message is deemed to be insufficiently tailored to the intended recipient, and suggesting that the user revise the message to be more tailored to the intended recipient.

In embodiments, the comparison score is a confidence score that indicates a relative level of confidence of similarity between the message fingerprint 160 to the communication fingerprint of the intended recipient. The comparison score may be determined by the communication module 122 using any suitable analytic techniques for generating a confidence score that indicates a relative level of confidence of similarity between two data structures. The threshold value may be any desired value and may be a default value programmed in the communication module 122 or may be defined by the user of the communication system 100, e.g., via the UI of the communication system 100.

In further aspects of the invention, the communication system 100 is configured to receive feedback from the recipient of the message 155, and to update the communication fingerprint of the individual based on the feedback. For example, after comparing the message fingerprint 160 to the communication fingerprint of the recipient, and after sending the message 155 to the recipient (e.g., personB in this example), the communication system 100 may collect feedback communication from the recipient in the form a reply in the form of one or more of text, visual, and auditory communication. For example, the message 155 may be an email and the recipient may respond to the message with another email, or a voicemail, or both. As another example, the message 155 may be a social media comment, and the recipient may respond to the message by indicating a status such as "like" or "don't like". Other types of feedback from the recipient may also be collected by the communication system 100.

In embodiments, upon receiving feedback from the recipient of the message 155, the system updates the communication fingerprint of the individual based on the feedback. As already described herein, an existing communication fingerprint of an individual may be updated upon receiving one or more new communications from the individual. In the feedback aspect of the invention, the feedback constitutes the one or more new communications from the individual, and the communication fingerprint of the individual is updated in the manner already described herein.

Figure 4:
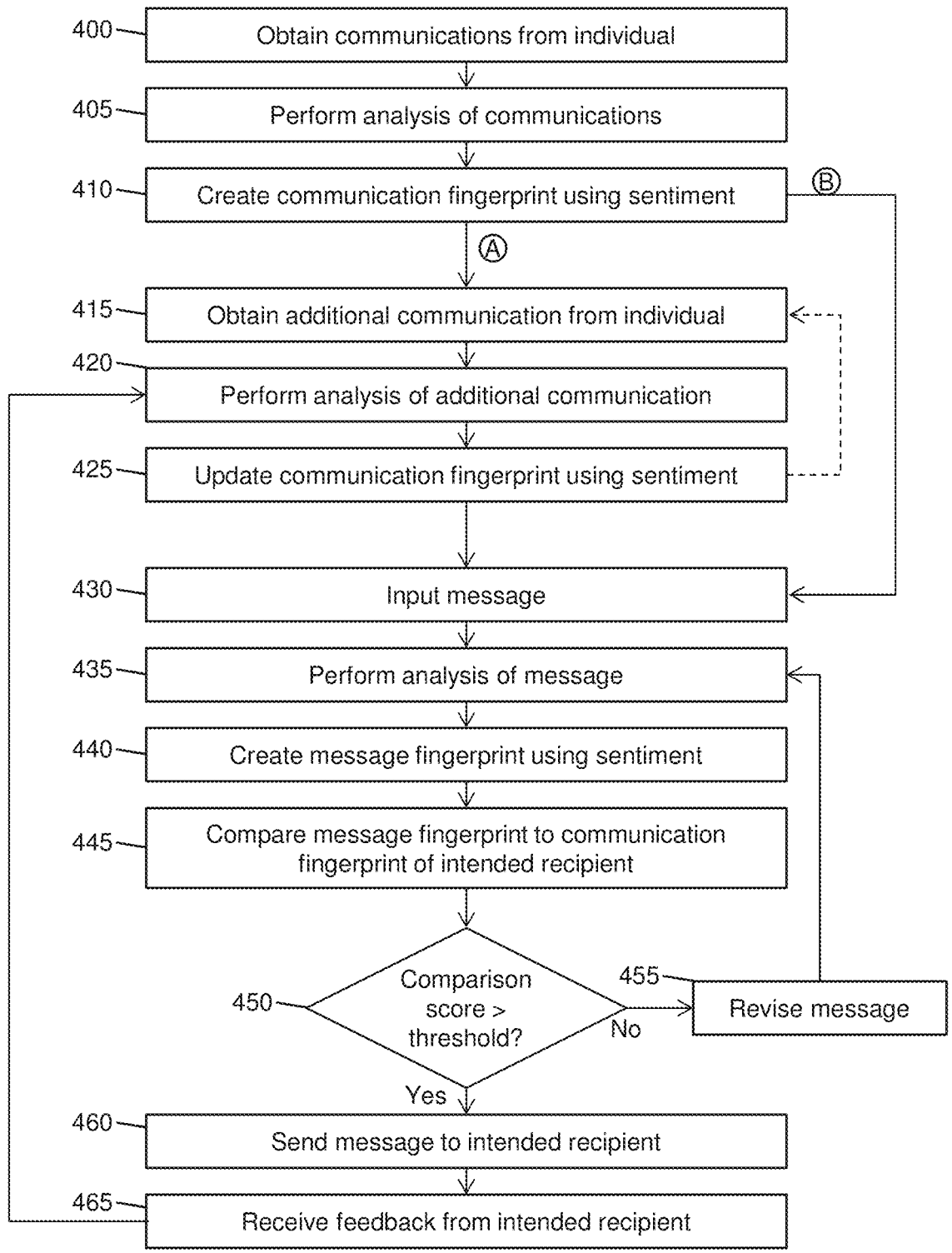
FIG. 4 shows a flowchart of a method in accordance with aspects of the invention.

FIG. 4 shows a flowchart of a method in accordance with aspects of the invention. Steps of the method of FIG. 4 may be performed in the environment illustrated in FIG. 2 and are described with reference to elements shown in FIG. 2. The steps of FIG. 4 are described with respect to a single individual, but it is understood that the steps can be repeated for plural different individuals, in which case a respective unique communication fingerprint is created and stored for each respective one of the plural individuals.

FIG. 4 depicts a method of tailoring messages to individuals using an individualized communication fingerprint based on sentiment analysis, in accordance with aspects of the invention. At step 400, a computer system (e.g., communication system 100) obtains communications from an individual. The communications may be from any one or more of text, visual, and auditory sources, and may be obtained in the manner described with respect to FIG. 2. The communications may be stored in computer based storage, e.g., storage system 34.

At step 405, a computer-based analysis is performed on the communications from step 400. In embodiments, the analysis is performed by an analysis module 130 of a cognitive computing server 110, e.g., in a manner described with respect to FIG. 2. The analysis may include, for example, at least one of: sentiment analysis; semantic analysis, and tone analysis. In embodiments, the communication system 100 transmits a request for sentiment analysis either directly to the cognitive computing server 110 or indirectly to the cognitive computing server 110 via a fingerprint server 105. The request may be in the form of an API call that includes the communications to be analyzed. The analysis module 130 performs an analysis of the communications and returns the analysis results either to the communication system 100 or the fingerprint server 105.

At step 410, a communication fingerprint is created using the analysis results from step 405. In embodiments, the communication fingerprint is created by a fingerprint module 125 of the fingerprint server 105, e.g., in a manner described with respect to FIG. 2. In one embodiment, the communication system 100 transmits a request for the fingerprint to the fingerprint server 105. The request may be, for example, an API call that includes the analysis results. In another embodiment, the fingerprint server 105 automatically generates the communication fingerprint based on receiving the analysis results from the cognitive computing server 110. After creating the communication fingerprint, the fingerprint server 105 sends the communication fingerprint to the communication system 100, which may store the communication fingerprint in storage system 34.

Following creating the communication fingerprint at step 410, the method may proceed along path "A" or path "B" as indicated in FIG. 4. Path "A" represents updating the communication fingerprint based on additional communications from the individual. Path "B" represents using the communication fingerprint to tailor a message to the individual.

At step 415, the communication system 100 obtains at least one additional communication from the individual. Step 415 may be performed in a manner similar to step 400, e.g., the communication system 100 collecting at least one of text, visual, and auditory communication from the individual.

At step 420, a computer-based analysis is performed on the additional communication from step 415. The analysis may be performed by the analysis module 130 of a cognitive computing server 110, e.g., similar to step 405 and in a manner described with respect to FIG. 2. The analysis may include, for example, at least one of: sentiment analysis; semantic analysis, and tone analysis. In embodiments, the communication system 100 transmits a request for analysis either directly to the cognitive computing server 110 or indirectly to the cognitive computing server 110 via a fingerprint server 105. The request may be in the form of an API call that includes the additional communication to be analyzed. The analysis module 130 performs the analysis of the additional communication and returns the analysis results either to the communication system 100 or the fingerprint server 105.

At step 425, the existing communication fingerprint for the individual is updated using the analysis results from step 420. The communication fingerprint may be updated by the fingerprint module 125 of the fingerprint server 105, e.g., in a manner described with respect to FIG. 2. In one embodiment, the communication system 100 transmits a request for the fingerprint to the fingerprint server 105. The request may be, for example, an API call that includes the analysis results and the existing communication fingerprint. In another embodiment, the fingerprint server 105 received the existing communication fingerprint as part of a request from the system at step 420, and the fingerprint module 125 automatically updates the communication fingerprint based on receiving the analysis results from the cognitive computing server 110. After updating the communication fingerprint, the fingerprint server 105 sends the updated communication fingerprint to the communication system 100, which may store the updated communication fingerprint in storage system 34.

At step 430 a message that is intended to be sent to the individual (i.e., the individual from step 400 for whom the communication fingerprint was created at step 410) is input to the communication system 100, e.g., as described with respect to FIG. 2. The message may be input in any suitable fashion. For example, the message may be input via a UI of the communication system 100. The message may be any one of text, visual, and auditory, or combinations thereof.

At step 435, an analysis of the message from step 430 is performed. In embodiments, the analysis is performed by the analysis module 130 of the cognitive computing server 110, e.g., in the manner described with respect to FIG. 2. The analysis may include, for example, at least one of: sentiment analysis; semantic analysis, and tone analysis. In embodiments, the communication system 100 transmits a request for analysis either directly to the cognitive computing server 110 or indirectly to the cognitive computing server 110 via a fingerprint server 105. The request may be in the form of an API call that includes the message from step 430 to be analyzed. The analysis module 130 performs the analysis of the message and returns the analysis results either to the communication system 100 or the fingerprint server 105.

At step 440, a message fingerprint is created for the message using the analysis results from step 435. In embodiments, the communication fingerprint is created by the fingerprint module 125 of the fingerprint server 105, e.g., in a manner described with respect to FIG. 2. In one embodiment, the communication system 100 transmits the request for the fingerprint to the fingerprint server 105. The request may be, for example, an API call that includes the analysis results from step 435. In another embodiment, the fingerprint server 105 automatically generates the message fingerprint based on receiving the analysis results from the cognitive computing server 110. After creating the message fingerprint, the fingerprint server 105 sends the message fingerprint to the communication system 100, which may store the message fingerprint in storage system 34.

At step 445, the message fingerprint is compared to the communication fingerprint of the intended recipient of the message, i.e., the individual from step 400 for whom the communication fingerprint was created at step 410. In embodiments, the comparison is performed by the communication module 122 of the communication system 100, e.g., in the manner described with respect to FIG. 2. For example, the communication module 122 may be programmed with analytic logic to perform a comparison of the data structure of the message fingerprint to the data structure of the communication fingerprint, and to generate a comparison score based on the comparing where the comparison score is a measure of similarity between the message fingerprint and the communication fingerprint (e.g., more similar fingerprints would have a relatively higher score and less similar fingerprints would have a relatively lower score).

At step 450, the comparison score from step 445 is compared to a threshold value. As described with respect to FIG. 2, the threshold value may be set at any desired value whereby comparison scores that are greater than the threshold value are deemed to be sufficiently tailored to the intended recipient, and comparison scores that are less than the threshold value are deemed to be insufficiently tailored to the intended recipient.

In the event the comparison score is less than the threshold value at step 450, then at step 455 the communication system 100 prompts the user to revise the message. For example, as described with respect to FIG. 2, the communication system 100 may display a prompt to a user via a UI where the prompt indicates the comparison score is less than the threshold value and suggests that the user revise the initial message. The prompt may include a suggested type and/or content of communication for the intended recipient based on (e.g., derived from) the communication fingerprint of the individual. The communication system 100 receives the revised message, e.g., via input at the UI, and returns to step 435 to begin the steps for determining a message fingerprint for the revised message.

In the event the comparison score is greater than the threshold value at step 450, then at step 460 the communication system 100 sends the message to the intended recipient. The message may be sent in any suitable manner, as described with respect to FIG. 2. Step 460 may include, for example, sending an email to a user device associated with the intended recipient. Step 460 may include the communication system 100 presenting an indication to the user, prior to sending the message, that the comparison score is greater than the threshold value such that the message is deemed sufficiently tailored to the intended recipient. Step 460 may also include asking for and receiving input from the user confirming a decision to send the message prior to actually sending the message.

At step 465, the communication system 100 receives feedback from the recipient of the message. The feedback may comprise any communication from the recipient of the message such as, for example, a reply in the form of one or more of text, visual, and auditory communication, as described with respect to FIG. 2. Upon receiving the feedback, the communication system 100 initiates steps to update the individual's communication fingerprint based on the feedback. In embodiments, the process returns to step 420 using the feedback as the additional communication.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for delivering tailored content to an individual, comprising:
    obtaining, by a computer system, communications of the individual;
    obtaining, by the computer system, a communication fingerprint for the individual based on an analysis of the communications of the individual;
    tailoring, by the computer system, a message to the individual using the communication fingerprint; and
    delivering the message to the individual,
    wherein the obtaining the communication fingerprint comprises:
        transmitting a first request to a cognitive computing server via a network, wherein the first request includes the communications of the individual;
        receiving sentiment analysis results of the communications of the individual from the cognitive computing server;
        transmitting a second request to a fingerprint server via the network, wherein the second request includes the sentiment analysis results; and
        receiving the communication fingerprint from the fingerprint server.

2. The method of claim 1, wherein the communications are selected from the group consisting of: emails, text messages, direct messages, and voicemails.

3. The method of claim 1, further comprising:
    obtaining a message fingerprint for the message based on analysis of the message; and
    creating a comparison score based on comparing the message fingerprint to the communication fingerprint.

4. The method of claim 3, wherein the tailoring comprises comparing the comparison score to a predefined threshold value and:
   indicating the message is sufficiently tailored to the individual when the comparison score is greater than the threshold value; and
   indicating the message is insufficiently tailored to the individual when the comparison score is less than the threshold value.

5. The method of claim 4, wherein the tailoring further comprises prompting a user to revise the message based on the comparison score being less than the threshold value.

6. The method of claim 1, further comprising:
   receiving feedback from the individual based on the message; and
   updating the communication fingerprint for the individual based on the feedback.

7. The method of claim 1, further comprising:
   obtaining at least one additional communication from the individual; and
   updating the communication fingerprint for the individual based on the at least one additional communication.

8. The method of claim 1, wherein the individual comprises a first individual and the communication fingerprint comprises a first communication fingerprint, and the method further comprises:
   obtaining, by the computer system, communications of a second individual; and
   obtaining, by the computer system, a second communication fingerprint for the second individual based on analysis of the communications of the second individual, wherein the first communication fingerprint is different from the second communication fingerprint.

9. A system comprising:
   a CPU, a computer readable memory and a computer readable storage medium associated with a computing device;
   program instructions to determine a communication fingerprint of an individual;
   program instructions to determine a message fingerprint of a message intended for the individual;
   program instructions to compare the message fingerprint to the communication fingerprint; and
   program instructions to output a result of the comparison via a user interface,
   wherein the determining the communication fingerprint comprises:
     transmitting a first request to a cognitive computing server via a network, wherein the first request includes communications of the individual;
     receiving sentiment analysis results of the communications from the cognitive computing server;
     transmitting a second request to a fingerprint server via the network, wherein the second request includes the sentiment analysis results; and
     receiving the communication fingerprint from the fingerprint server, and
   wherein the program instructions are stored on the computer readable storage medium for execution by the CPU via the computer readable memory.

10. The system of claim 9, further comprising:
    program instructions to receive feedback from the individual based on the message, and
    program instructions to update the communication fingerprint of the individual based on an analysis of the feedback.

11. The system of claim 9, further comprising:
    program instructions to receive at least one additional communication from the individual; and
    program instructions to update the communication fingerprint of the individual based on an analysis of the at least one additional communication.

12. A computer program product for delivering tailored content to an individual, the computer program product comprising a computer readable storage medium having program instructions embodied therewith, the program instructions executable by a computing device to cause the computing device to:
    perform call to a server via a network, wherein the call includes communications of the individual;
    receive a communication fingerprint of the individual from the server in response to the call;
    receive a message via a user interface (UI);
    determine a message fingerprint of the message based the message;
    compare the message fingerprint to the communication fingerprint; and
    output a result of the comparison via the UI.

13. The computer program product of claim 12, wherein the program instructions cause the computing device to:
    receive feedback from the individual based on the message; and
    update the communication fingerprint of the individual based on an analysis of the feedback.

14. The computer program product of claim 12, wherein the program instructions cause the computing device to:
    receive at least one additional communication from the individual; and
    update the communication fingerprint of the individual based on an analysis of the at least one additional communication.

15. The computer program product of claim 12, wherein the comparing the message fingerprint to the communication fingerprint comprises:
    generating a comparison score that is a measure of similarity between the message fingerprint to the communication fingerprint; and
    comparing the comparison score to a predefined threshold value.

* * * * *